(12) United States Patent
Merrick et al.

(10) Patent No.: US 12,227,944 B2
(45) Date of Patent: Feb. 18, 2025

(54) PRE-CONSOLIDATED FINES LAYER FOR IMPROVED ENGINEERED WOOD PRODUCTS

(71) Applicant: LOUISIANA-PACIFIC CORPORATION, Nashville, TN (US)

(72) Inventors: Gareth Paul Merrick, Gig Harbor, WA (US); Brian St. Germain, Mt. Juliet, TN (US)

(73) Assignee: LOUISIANA-PACIFIC CORP., Nashville, TN (US)

( * ) Notice: Subject to any disclaimer, the term of this patent is extended or adjusted under 35 U.S.C. 154(b) by 0 days.

(21) Appl. No.: 17/848,913

(22) Filed: Jun. 24, 2022

(65) Prior Publication Data

US 2022/0412084 A1    Dec. 29, 2022

Related U.S. Application Data

(60) Provisional application No. 63/214,299, filed on Jun. 24, 2021.

(51) Int. Cl.
*E04C 2/24*    (2006.01)
*B32B 5/02*    (2006.01)
(Continued)

(52) U.S. Cl.
CPC .............. *E04C 2/246* (2013.01); *B32B 5/022* (2013.01); *B32B 5/024* (2013.01); *B32B 5/26* (2013.01); *B32B 7/12* (2013.01); *B32B 29/005* (2013.01); *B32B 29/02* (2013.01); *B32B 29/06* (2013.01); *B32B 37/02* (2013.01); *B32B 37/10* (2013.01); *B32B 2250/03* (2013.01); *B32B 2260/021* (2013.01); *B32B 2260/046* (2013.01); *B32B 2262/062* (2013.01); *B32B 2305/22* (2013.01); *B32B 2307/102* (2013.01);
(Continued)

(58) Field of Classification Search
CPC .................................. B32B 37/02; E04C 2/16
See application file for complete search history.

(56) References Cited

U.S. PATENT DOCUMENTS

| 4,364,984 A | 12/1982 | Wentworth | |
| 5,275,682 A * | 1/1994 | Gotz | B27N 3/06 |
| | | | 156/289 |

(Continued)

OTHER PUBLICATIONS

International Search Report and Written Opinion, PCT/US22/049291, Lousiana-Pacific Corp. (international filing date Nov. 8, 2022).

(Continued)

*Primary Examiner* — Carson Gross
(74) *Attorney, Agent, or Firm* — Wayne Edward Ramage; Baker Donelson

(57) ABSTRACT

An engineered wood based siding, cladding or panel with a pre-consolidated fines layer (PCF) applied to the top of the main strand matrix layers to minimize telegraphing and provide an improved surface appearance. The PCF is consolidated prior to application to the surface of the strand matrix or mat, and takes the place of a loose fines layer. The PCF prevents the loss of fines into the strand matrix, effectively keeping the fines at the surface so they can effectively and efficiently function to prevent or eliminate strand telegraphing, and provide a smooth finished surface for the product.

15 Claims, 5 Drawing Sheets

(51) Int. Cl.
  *B32B 5/26* (2006.01)
  *B32B 7/12* (2006.01)
  *B32B 29/00* (2006.01)
  *B32B 29/02* (2006.01)
  *B32B 29/06* (2006.01)
  *B32B 37/02* (2006.01)
  *B32B 37/10* (2006.01)

(52) U.S. Cl.
  CPC ............... *B32B 2307/3065* (2013.01); *B32B 2307/7145* (2013.01); *B32B 2307/7246* (2013.01); *B32B 2310/0862* (2013.01); *B32B 2317/12* (2013.01); *B32B 2419/00* (2013.01); *B32B 2607/02* (2013.01)

(56) References Cited

U.S. PATENT DOCUMENTS

| | | | |
|---|---|---|---|
| 5,425,976 A | 6/1995 | Clarke et al. | |
| 5,951,795 A * | 9/1999 | Calve | B27N 3/04 156/62.8 |
| 11,752,657 B2 * | 9/2023 | Sokka | B32B 21/14 144/350 |
| 2007/0102113 A1 * | 5/2007 | Lau | B32B 21/02 156/307.7 |
| 2009/0098387 A1 | 4/2009 | Brady et al. | |
| 2013/0209730 A1 * | 8/2013 | Barker | B32B 5/16 428/107 |
| 2013/0281622 A1 * | 10/2013 | Umemura | B29D 7/00 524/871 |
| 2017/0151690 A1 * | 6/2017 | Li | B27N 3/24 |
| 2018/0126584 A1 | 5/2018 | Ritter | |
| 2020/0156347 A1 | 5/2020 | Kuvik | |
| 2020/0247002 A1 | 8/2020 | Merrick et al. | |
| 2022/0355507 A1 * | 11/2022 | Schoeler | B27N 3/02 |

OTHER PUBLICATIONS

International Search Report and Written Opinion, PCT/US22/034893, Lousiana-Pacific Corp. (international filing date Jun. 24, 2022).

International Search Report and Written Opinion, PCT/US22/034051, Lousiana-Pacific Corp. (international filing date Jun. 17, 2022).

* cited by examiner

US 12,227,944 B2

PRE-CONSOLIDATED FINES LAYER FOR IMPROVED ENGINEERED WOOD PRODUCTS

This application claims benefit of and priority to U.S. Provisional Application No. 63/214,299, filed Jun. 24, 2021, which is incorporated herein by specific reference for all purposes.

FIELD OF INVENTION

This invention relates to a system and process for producing an engineered wood based siding, cladding or panel (e.g., manufactured with wood veneer, strands or fibers) with a pre-consolidated fines layer (PCF) placed on the main strand layers to minimize telegraphing and improve the appearance of the final product.

SUMMARY OF INVENTION

This invention relates comprises a method or process for producing an engineered wood based siding, cladding or panel (e.g., manufactured with wood veneer, strands or fibers) with a pre-consolidated fines layer (PCF) to minimize telegraphing and provide an improved surface appearance.

Prior art processes typically apply a "fines layer" to the surface of the multi-layer strand matrix or mat during the manufacturing process. The fines in the fines layers comprise a loose "wood flour" or loose, unconsolidated small particles of wood, typically a by-product from the strand processing. This functional fines layer is added to help minimize telegraphing of strands or flakes on the surface of the siding or finished product. However, a portion of the fines fall into open spaces or voids in the strand matrix, which reduces the effectiveness of the fines layer in resisting strand telegraphing.

In various exemplary embodiments, a "preconsolidated fines layer" (PCF) is applied to the surface of the strand matrix or mat in place of the prior art fines layer. The PCF sits on the strand matrix, and by its configuration and design prevents the loss of fines into the strand matrix. The PCF thus effectively keeps the fines at the surface so they can effectively and efficiently function to prevent or eliminate strand telegraphing, and provide a smooth finished surface for the product.

DETAILED DESCRIPTION OF EXEMPLARY EMBODIMENTS

Figure 1:
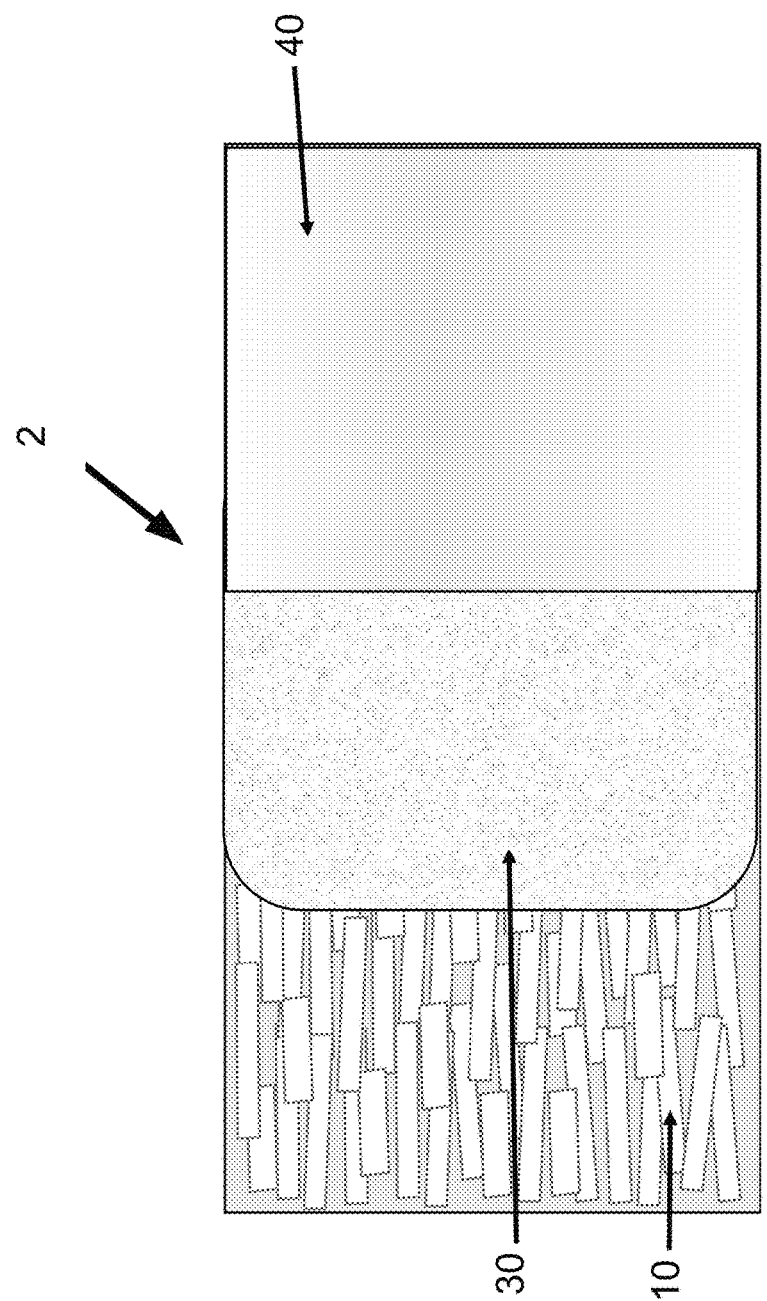
FIG. 1 shows a top partial view of a manufactured wood product with a pre-consolidated fines layer (PCF) on a multi-layered strand matrix (not to scale).
Figure 2:
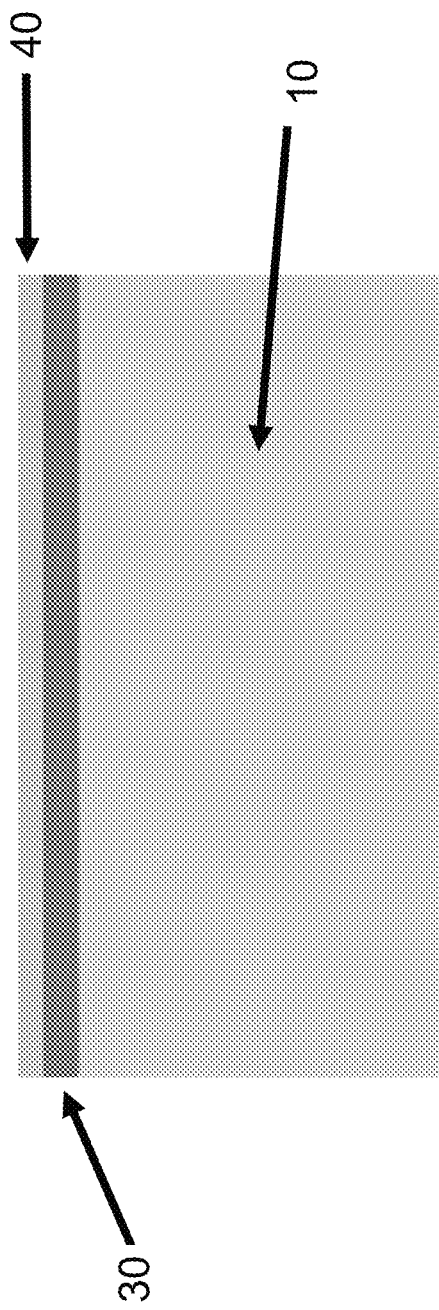
FIG. 2 shows a partial side view of FIG. 1 (not to scale)

In various exemplary embodiments, the present invention comprises a method or process for producing an engineered wood based siding, cladding or panel 2 (e.g., manufactured with wood veneer, strands or fibers) with a pre-consolidated fines layer (PCF) 30 to minimize telegraphing and provide an improved surface appearance.

Engineered wood products (such as OSB, LSL, LVL, or plywood) typically are produced by various primary (and sometimes secondary) pressing processes. Examples of such processes are in U.S. Pat. Nos. 4,364,984; 6,461,743; 5,718,786; 5,525,394; 5,470,631; and 5,425,976; and U.S. patent application Ser. No. 15/803,771; all of which are incorporated herein in their entireties by specific reference for all purposes.

The nature of the engineered wood manufacturing process results in inherent sub-surface and surface defects or imperfections. Sub-surface defects often result in visible defects or imperfections on the surface (commonly referred to as "telegraphing"). Telegraphing on products in use (after manufacturing) is typically caused by moisture, i.e., a swelling response inherent to all wood products. This response can vary in severity based on several factors, including, but not limited to, wood geometry (e.g., strand, fiber, particle, strand) and density of the product. Surface quality may also be influenced by variation in local density and the presence of voids (i.e., areas without wood fiber) that are close to the product's surface. For example, a difference in surface texture may result directly from the pressing process, where a localized difference in density (e.g., void, no-void, or more/less wood fiber) results in a differential response to the press plate pressure.

Deeply or aggressively embossed or textured surfaces often can distract the eye from noticing these imperfections, but smooth (non-embossed or minimally embossed) surfaces are more susceptible to having this telegraphing become noticeable, especially under critical light conditions. This is a particular problem with engineered wood based smooth surface siding or cladding when installed on a building, where varying light conditions and viewing angles make undesirable surface imperfections noticeable.

During the manufacturing of strand-based engineered wood products, several formers (typically four, five or six) with orientation heads apply strands in multiple layers to a continuously moving conveyor belt. Each forming head will inevitably have a varying number of strands layered on top of one another to form an intertwined layer of stands. As each forming head operates independently from one another, the variation of the number of strands that is ultimately achieved in any one location in the final layered mat contains the combined variation of all the forming heads. This variation is advantageous in the pressing process as it helps to better facilitate the escape of volatilized water that is necessary to mold the strands together under high heat and pressure during the pressing process, resulting in a structural panel product. However, when using such products in an aesthetic application, such as exterior cladding, this variation in the number of strands that comprise the thickness of the product creates some challenges. As strands are still relatively large particles of wood, as compared to the fines used in other wood composites such as MDF (medium density fiberboard) and particleboard, an engineered wood product comprised of strands is still subject to the inherent properties of the wood itself.

One such property is the change in dimension in response to a change in moisture content. All wood species expand and contract at various levels in response to changing moisture conditions. This is largely due to the transport systems within the wood cell structure itself which are intended to carry water through a living tree. As strands are still large pieces of wood, these transport systems largely remain intact within each strand. With a varying number of strands within each location across the panel, and each strand responding with a change in dimension as moisture conditions change within the panel, there is the potential for differential thickness swell across the surface of any panel. In products that are used in aesthetic applications, such as exterior cladding, even subtle (i.e., less than 0.002") differences in thickness can be seen by the naked eye in critical light conditions. Therefore, it becomes a requirement of utilizing a strand-based product in these aesthetic applications to effectively control this differential movement or strands from becoming visible in addition to the other inherent surface imperfections that occur in a strand based product manufacturing process.

One approach is the application of a loose "fines layer" to the surface of the multi-layer strand matrix or mat during the manufacturing process. The fines in the fines layers comprise loose "wood flour" or small particles of wood, typically a by-product from the manufacturing processing with no optimization (i.e., no sorting or classifying). This functional fines layer is added to help minimize telegraphing of strands or flakes on the surface of the siding or finished product. However, a portion of the fines fall into open spaces or voids in the strand matrix, which reduces the effectiveness of the fines layer in resisting strand telegraphing. Adding additional fines may partially overcome this problem, but this creates an unbalanced section that can decrease the product's stiffness and strength. For panel products, it may also impact product stability. An example of instability is warping or the product not remaining flat. These properties are especially important for engineered wood composites that are used in structural applications.

U.S. Pat. No. 6,461,743 defines "fines" as wood particles having an average width and thickness several times smaller than the width of the wood strands used to form strand matrix layers. It also notes that fines typically may be defined as wood particles having a width and thickness less than 0.50 mm. If further describes the use of particles where the average size of smaller particles is less than the average size of the materials comprising the mat, where the smaller particles have an average particle size of not more than about 2 mm, and more preferably an average particle size of not more than about 1 mm.

U.S. patent application Ser. No. 17/843,544, filed Jun. 17, 2022 (which is incorporated herein in its entirety by specific reference for all purposes), discloses a "fines interface layer" (FIL) that is applied to the surface of the strand matrix or mat prior to application of the fines layer. The FIL sits between the strand matrix and the loose fines layer, and prevents the loss of fines into the strand matrix (i.e., into open space or voids in the strand matrix). The FIL thus keeps the fines at the surface where they can effectively and efficiently function to prevent or eliminate strand telegraphing, and provide a smooth finished surface for the product. However, this approach requires application of an additional layer to the product.

Additionally, in some engineered wood composite manufacturing processes, the use of loose fines may not be an optimal or practical approach. Some processes (e.g., pre-existing facilities) may not have the space required for the specialized equipment needed to handle loose fines. Further, the use of loose fines may not provide for the required degree of control over application density, resulting in unacceptable variation and telegraphing.

The PCF of the present invention addresses those problems. The PCF 30 is applied to the surface of the strand matrix or mat 10 prior to or simultaneously with application of a performance overlay 40. The PCF 30 replaces the loose fines layer, as described above, and due to its consolidated nature at the time of application to the strand matrix or mat, does not require a separate FIL, although it may be used with an FIL in some embodiments. The PCF may itself be made in the same or a different process and at the same or a different facility as the final engineered wood composite product. In several embodiments, the performance overlay may be laminated to the PCF (or vice-versa) prior to the combined performance overlay and PCF being applied to the strand matrix or substrate layer.

The PCF 30 replaces the loose fines layer, and sits between the strand matrix 10 and the performance overlay 40. As the fines are not loose and unconsolidated, the PCF reduces or eliminates the loss of fines into the strand matrix (i.e., into open space or voids in the strand matrix). The PCF thus keeps the fines at the surface of the strand matrix where they can effectively and efficiently function to prevent or eliminate strand telegraphing and help provide a smooth finished surface for the product. The PCF thus eliminates the need to use excessive amounts of loose fines, thereby reducing the risk of creating an unbalanced cross section with its associated loss in strength, stiffness, and stability.

Pre-consolidating these fines into a cohesive and conveyable layer reduces or eliminates loss of prior art loose fines into the voids, providing an engineered solution to this problem. Additionally, incorporating specialty additives into or onto this pre-consolidated layer provides for targeted performance improvement with respect to fire, moisture resistance, biological attack and increased strength and stiffness. These specialty additives can be more evenly and consistently added to the PCF during formation of the PCF, or more precisely added to target areas or sections of the PCF, as compared to application through blending with matrix strands or post-mat formation application (e.g., spraying or the like) to the matrix strands, which can lead to inconsistencies or variations in application. Examples of specialty additives include, but are not limited to, fire retardants, waxes, fungicides, insecticides and reinforcing materials of natural or synthetic origin (e.g., woven or non-woven fabrics, individual or chopped fibers).

In various exemplary embodiments, the PCF comprises a layer of fines material that are consolidated together prior to application to the top layer of the matrix strands. The fines may be consolidated through various processes. In some embodiments, the fines are consolidated through adhesives or glues. In additional embodiments, a backer or similar material may be used to effect consolidation.

In several embodiments, the PCF may comprise a fabric (such as, but not limited to, a woven or non-woven synthetic or natural material), specialty papers, resin-saturated papers, pulp mats, glue (adhesive) films, plastic films, minerals, or similar materials. The material used for or with the PCF should be compatible with the particular manufacturing process, i.e., compatible with any adhesive, additives, heat and/or pressure that may be used. In some embodiments, for example, the manufacturing process comprises high temperatures and pressure. In several embodiments, the material should be able to withstand high temperatures up to 230 degrees F. While in some embodiments the PCF may be chosen to withstand high temperatures and pressure, in alternative embodiments the PCF may be chosen so that the manufacturing process produces changes in the form or configuration of the PCF material (e.g., melting or flowing). Thus, for example, the PCF material may comprise glass or glass-like material, including, but not limited to, binding material that partially or fully melts, flows and/or bonds (adheres) during the pressing process.

In other embodiments, a stiffening material is added to the PCF layer, so that the PCF becomes stiffer and stronger during the manufacturing process and helps provide additional strength and stiffness to the final product itself. In further exemplary embodiments, the PCF material may be selected due to natural material properties, such as, but not limited to, fire resistance, fungal resistance, moisture/water resistance, sound dampening, or the like. Alternatively, or in addition, the PCF may be treated to provide or enhance such properties. The PCF layers may be smooth or textured or a combination or mixture of each.

Figure 3:
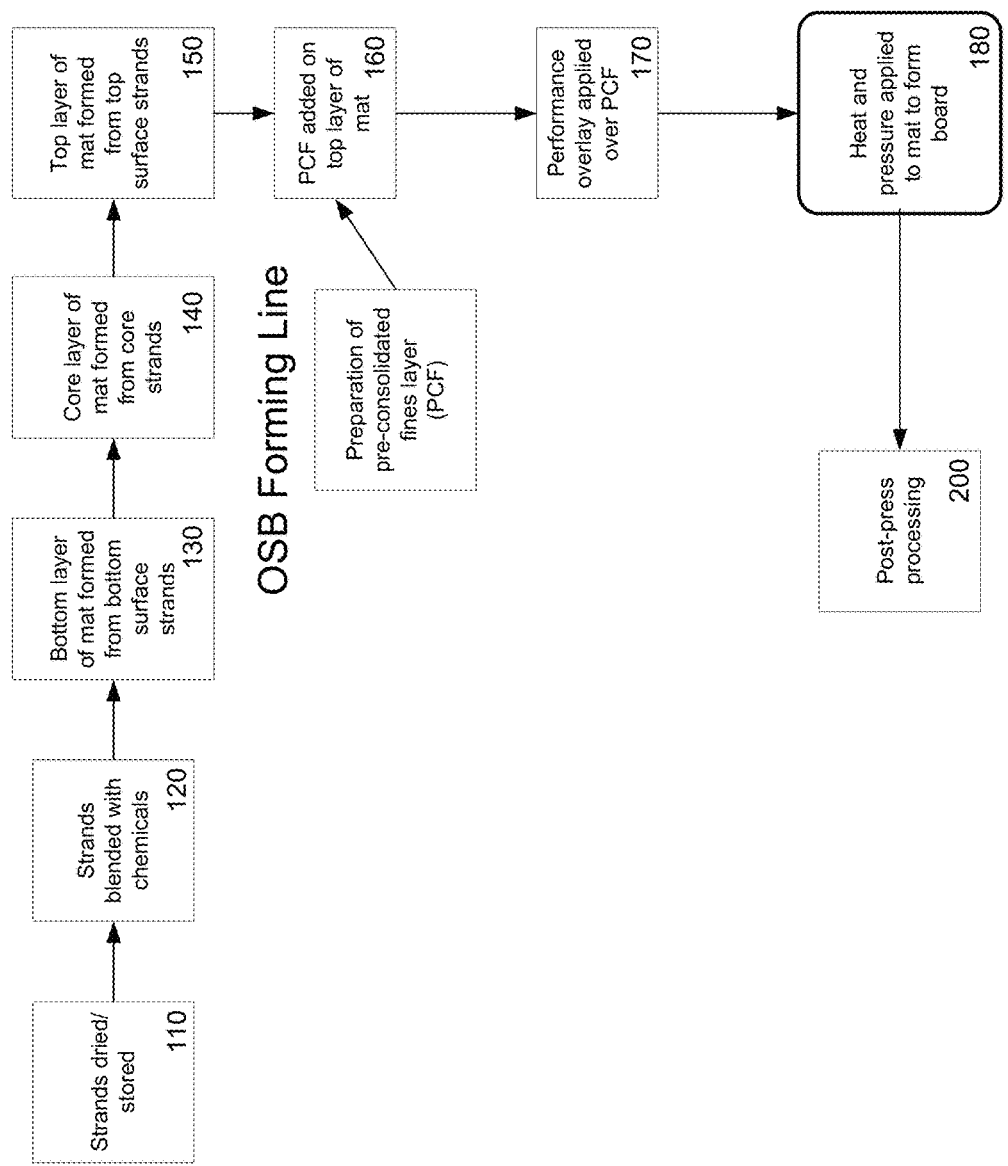
FIG. 3 shows a diagram of a method in accordance with the present invention.

One exemplary method of production comprises the following steps. Strands/flakes are processed/treated (i.e., cut, dried, and stored 110), then treated and/or coated with adhesive and performance enhancing additives and chemicals (e.g., wax, resin, and the like) 120. Strands designated for particular layers may receive different treatment, although in some cases strands are treated identically regardless of intended layer. The strands are then used to form the appropriate layers in order (e.g., first bottom surface, then core, then top surface), by depositing the designated strands 130, 140, 150 onto the production or forming line to form a multi-layer mat or strand matrix. The number of layers typically varies from 2 to 5 layers (FIG. 3 shows 3 layers). The PCF described above is then placed 160 on the upper surface of the mat. The PCF may be preformed and applied to the mat as a whole, or the material forming the PCF may be subjected to heat and/or pressure and extruded onto the upper surface of the mat as it passes underneath the PCF former. An overlay or performance overlay (such as, but not limited to, a paper overlay) 170 is then placed on top of the fines layer. The overlay may, for example, comprise a primed paper overlay with performance additives.

The assembled, unbonded layers are then subjected to further processing depending on the final product desired. Suitable adhesives include but are not limited to those selected from an isocyanate, phenolic, hot-melt polyurethane or melamine category alone or in combination. Pressure may be applied using several methods including but not limited to a hot press, cold press or steam-injection press. The process may be continuous or non-continuous (batch) or a combination or hybridization of these. Heat may be conveyed using various methods, to include but not be limited to steam, microwaves, thermal oil and the like.

For example, in one embodiment the assembled, unbonded layers are conveyed into a press for final consolidation and bonding under pressure. In another embodiment, as seen in FIG. 3, the assembled, unbonded layers are conveyed into a hot press 180 for final consolidation and bonding under heat and pressure. In yet another embodiment, the assembled, unbonded layers are subjected to microwaves with or without a heated platen. In a further embodiment, the assembled, unbonded layers are subjected to super-heated steam. After pressing, the resulting board may then be subject to further post-press processing 200 (e.g., additional overlays, secondary pressing or processing, trimming, sizing, priming, sealing, and packaging), depending on the desired final end product.

The present invention may be used with any engineered wood manufacturing process, regardless of the end-use application, and is not limited to siding. For example, it can be used with OSB manufactured as part of a "combination" product, such as, but not limited to, an OSB strand core with particleboard or fiberboard faces.

Similarly, PCFs may be used on one or both faces or surfaces of a product (i.e., a two-surface smooth product). If a single PCF is used, it may be used on the bottom surface or top surface of the product. Thus, the PCF may be used on the top surface only, the bottom surface only, or on both surfaces. In the case of an PFC used on the bottom surface, the above-described method is modified to include a step of placing a bottom PCF on the forming or production line prior to the formation of the bottom layer of the mat 30 (the bottom layer of the mat is then formed on the bottom PCF).

Figure 4:
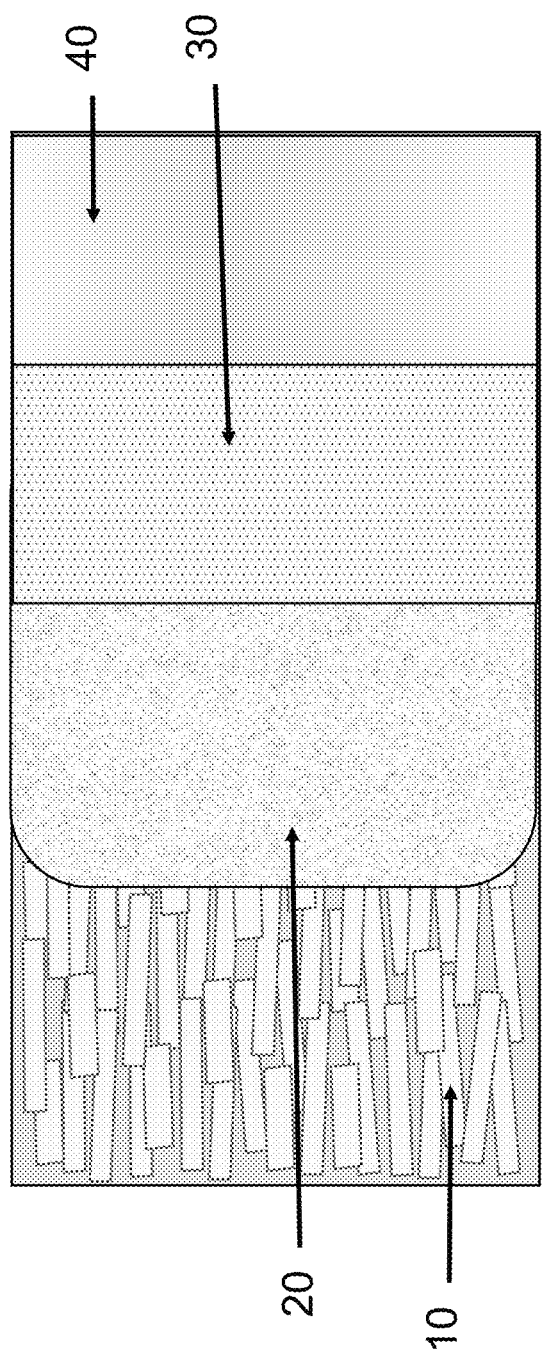
FIG. 4 shows a top partial view of a manufactured wood product with a PCF and a fines interface layer (FIL) (not to scale).
Figure 5:
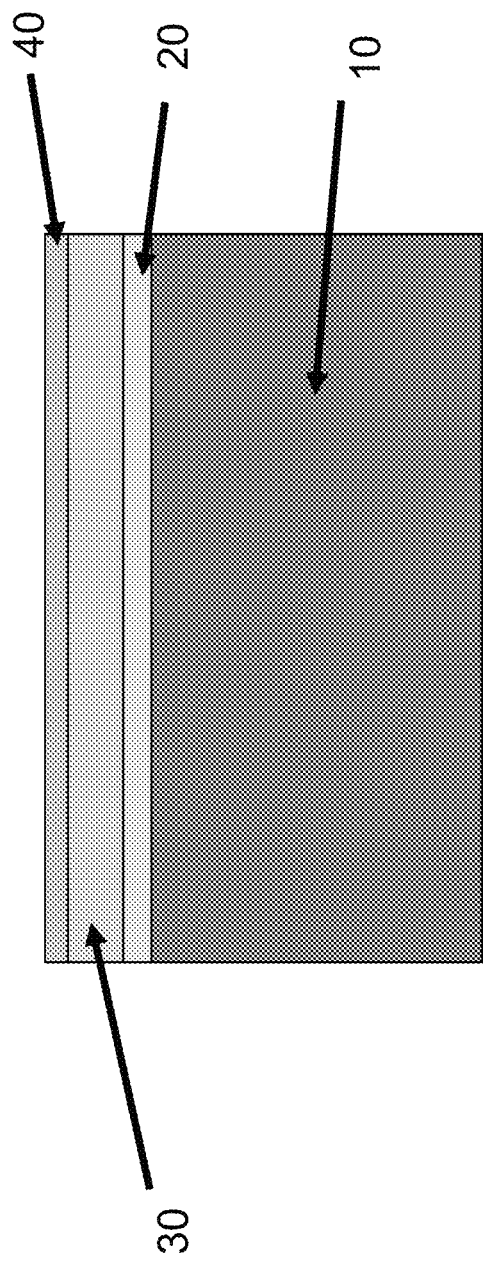
FIG. 5 shows a partial side view of FIG. 4 (not to scale).

In various exemplary embodiments, as seen in FIGS. 4 and 5, the PCF may be used in conjunction with a "fines interface layer" (or FIL) as described above. The FIL 20 is applied to the surface of the strand matrix or mat (e.g., a multi-layer strand matrix with proprietary alignment) 10 prior to application of the PCF 30. The FIL sits between the strand matrix 10 and the PCF 30. The FIL may comprise a fabric (such as, but not limited to, a woven or non-woven synthetic or natural material), specialty papers, resin-saturated papers, pulp mats, glue (adhesive) films, plastic films, minerals, or similar materials that can be used to separate the strand matrix or mat and the PCF.

The material used for the FIL should be compatible with the particular manufacturing process, i.e., compatible with any adhesive, additives, heat and/or pressure that may be used. In some embodiments, for example, the manufacturing process comprises high temperatures and pressure. In several embodiments, the material should be able to withstand high temperatures up to 230 degrees F. While in some embodiments the FIL may be chosen to withstand high temperatures and pressure, in alternative embodiments the FIL may be chosen so that the manufacturing process produces changes in the form or configuration of the FIL material (e.g., melting or flowing). Thus, for example, the FIL material may comprise glass or glass-like material, including, but not limited to, binding material that partially or fully melts, flows and/or bonds (adheres) during the pressing process.

In other embodiments, a stiffening material is added to the FIL, so that the FIL becomes stiffer and stronger during the pressing process, and helps provide additional strength and stiffness to the final product itself. In further exemplary embodiments, the FIL material may be selected due to natural material properties, such as, but not limited to, fire resistance, fungal resistance, moisture/water resistance, sound dampening, or the like. Alternatively, or in addition, the FIL may be treated to provide or enhance such properties.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. An improved method of producing an engineered wood product, comprising the steps of:
    forming a multi-layer strand matrix on a production line, said strand matrix comprising a top surface;
    applying a pre-consolidated fines layer on the top surface of the strand matrix, said pre-consolidated fines layer comprising a plurality of fines consolidated on a paper layer prior to application of the pre-consolidated fines layer to the top surface of the strand matrix, and further comprising an upper surface with at least some of the plurality of fines opposite the strand matrix; and consolidating and bonding the strand matrix and pre-consolidated fines layer together using heat and/or pressure.

2. The method of claim 1, wherein the pre-consolidated fines layer is configured to prevent the passage of fines from the pre-consolidated fines layer into the strand matrix.

3. The method of claim 1, wherein the pre-consolidated fines layer further comprises fabric.

4. The method of claim 3, wherein the fabric is a non-woven synthetic or natural material.

5. The method of claim 3, wherein the fabric is a woven synthetic or natural material.

6. The method of claim 1, wherein the pre-consolidated fines layer further comprises a plastic film, or glue or adhesive film.

7. The method of claim 1, wherein the paper layer in the pre-consolidated fines layer comprises a resin-impregnated or resin-saturated paper.

8. The method of claim 1, wherein the pre-consolidated fines layer partially or fully melts during the step of consolidating and bonding.

9. The method of claim 1, wherein the pre-consolidated fines layer comprises a stiffener.

10. The method of claim 1, wherein the pre-consolidated fines layer provides one or more of the following: fire resistance; fungal resistance; moisture resistance; and sound dampening.

11. The method of claim 1, further comprising the step of an applying an overlay on the upper surface of the pre-consolidated fines layer.

12. The method of claim 1, wherein the step of consolidating and bonding comprises application of heat and pressure using a hot press.

13. The method of claim 1, wherein the step of consolidating and bonding comprises application of pressure using a cold press.

14. The method of claim 1, wherein the step of consolidating and bonding comprises application of microwaves with or without a heated platen.

15. The method of claim 1, wherein the step of consolidating and bonding comprises application of super-heated steam.

\* \* \* \* \*